Oct. 18, 1966   J. A. BRIGHT   3,279,871
INSTRUMENT HOUSING AND SUPPORT
Filed Feb. 23, 1965   3 Sheets-Sheet 2
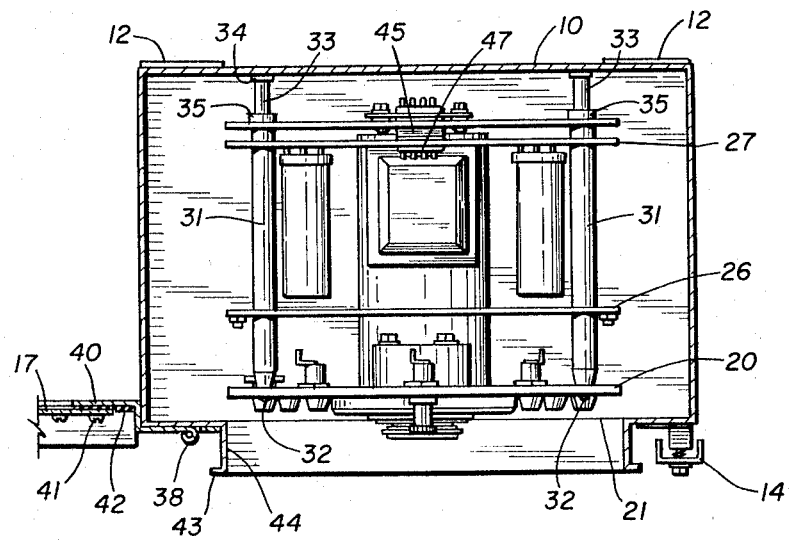
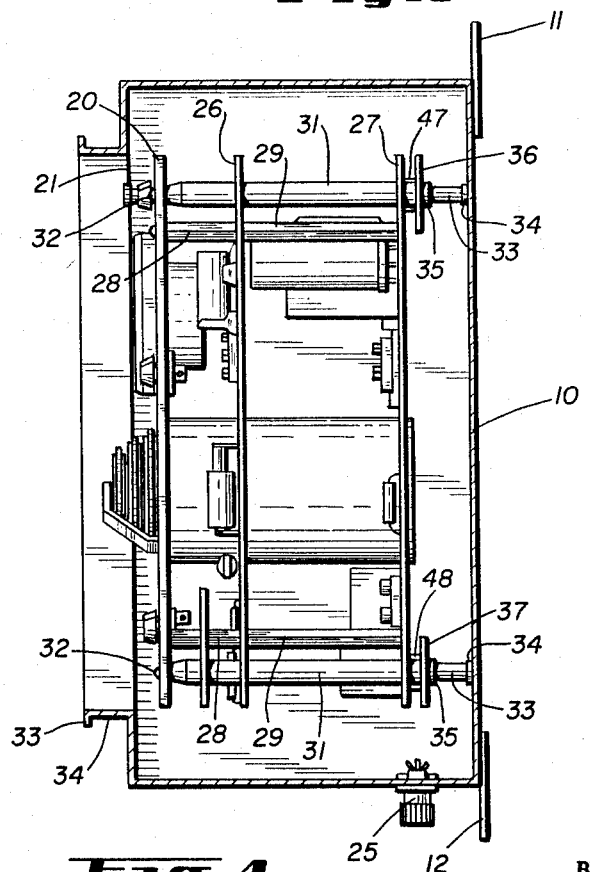
INVENTOR.
James A. Bright
ATTORNEYS Oct. 18, 1966  J. A. BRIGHT  3,279,871
INSTRUMENT HOUSING AND SUPPORT
Filed Feb. 23, 1965  3 Sheets-Sheet 3
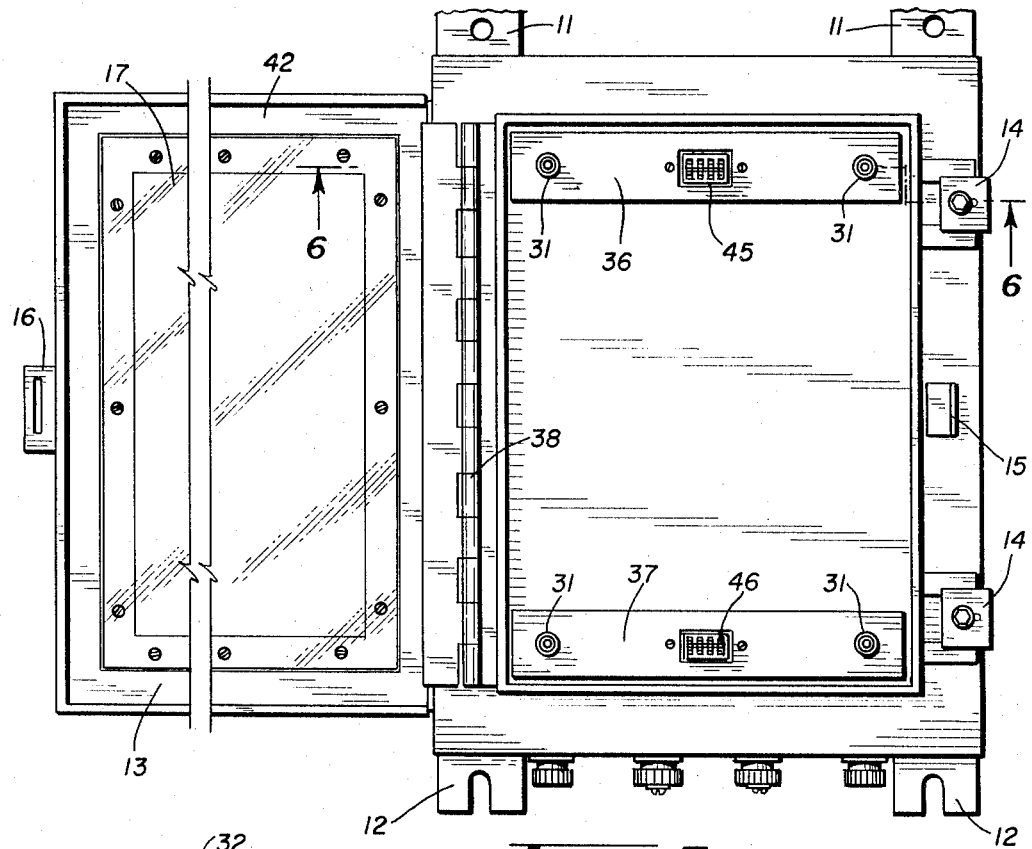
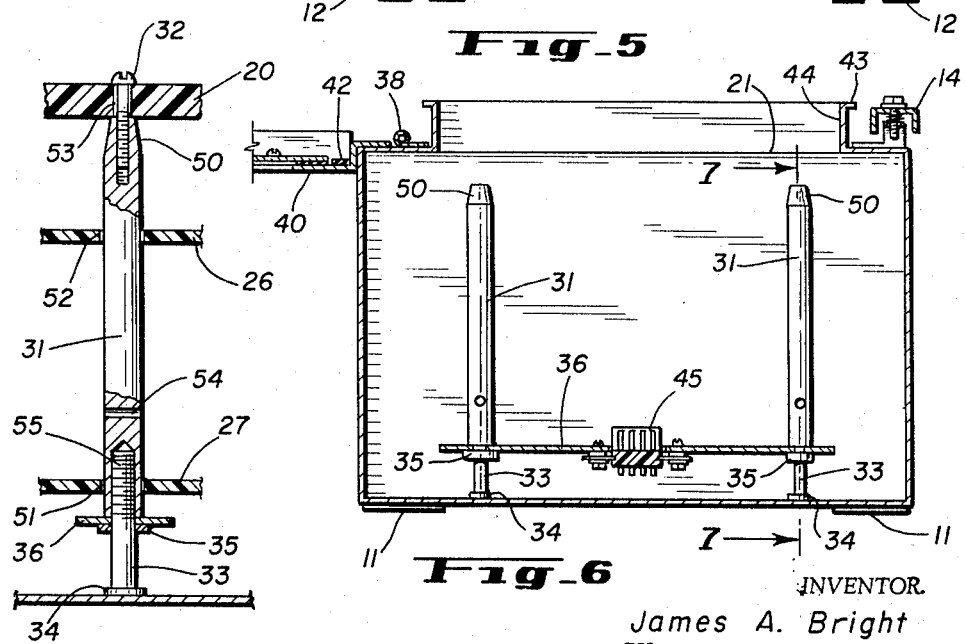
INVENTOR.
James A. Bright
BY
ATTORNEYS “United States Patent Office”

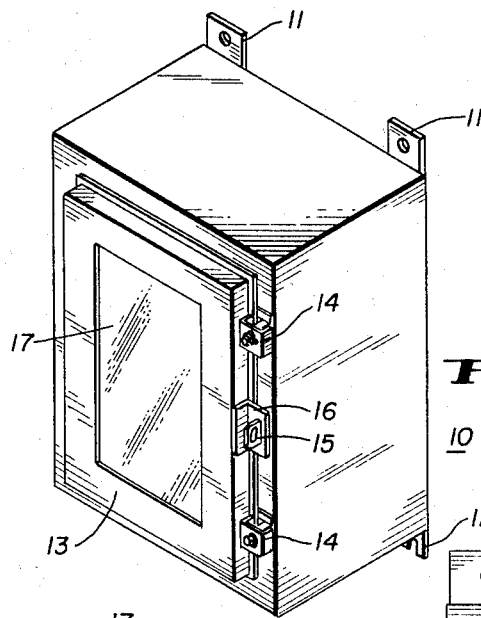
Fig_1
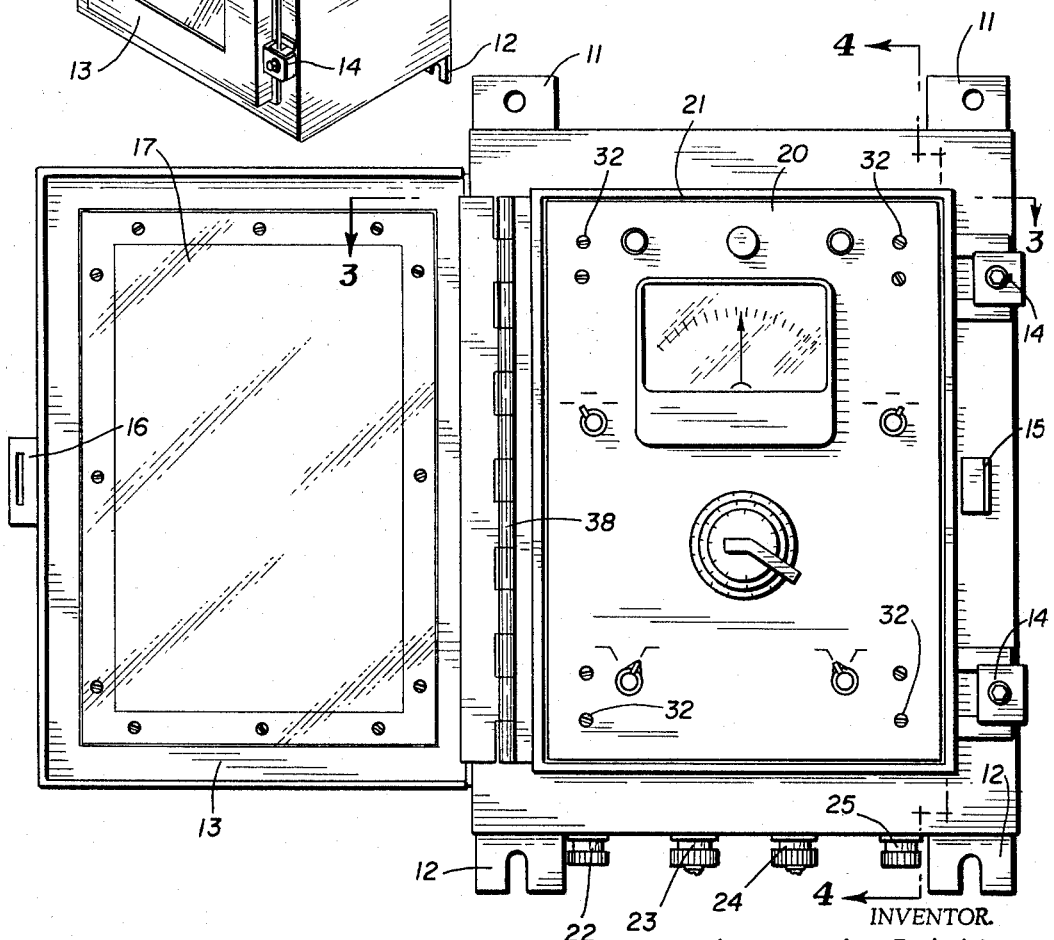
Fig_2
INVENTOR.
James A. Bright
BY
ATTORNEY

3,279,871
Patented Oct. 18, 1966

3,279,871
INSTRUMENT HOUSING AND SUPPORT
James A. Bright, 4781 E. Colorado Ave., Denver, Colo.
Filed Feb. 23, 1965, Ser. No. 434,432
2 Claims. (Cl. 312—223)

This invention relates to housings and supports for electric instruments and the like and particularly to an improved mounting and support for electric instruments enclosed in sealed cabinets.

Various types of instruments are required to be mounted in cabinets and housings to protect them from dust accumulation and from damage. Such housings facilitate the handling of the instruments and provide for the mounting and care of the instruments as separate units. Some instruments, for example instruments for measuring atmospheric conditions or the conditions of liquids, are required to be completely closed and sealed in order to prevent deterioration of the instruments or undesirable changes in the ambient conditions of the components in the instrument. Such instruments, enclosed in sealed housings, require opening of the housing for access and servicing and it is desirable that the instrument be readily accessible or easily withdrawn from the housing. Accordingly, it is an object of the present invention to provide a mounting assembly for instruments having closed housings including an improved arrangement for moving the instrument in and out of the housing and for securing it in the housing.

It is another object of this invention to provide a guiding and positioning support for instruments mounted in sealed housings including an improved arrangement for facilitating the insertion and removal of an instrument from a housing having a single access opening.

Briefly, in carrying out the objects of this invention in one embodiment thereof, a metal housing having a single rectangular door opening and a gasketed door for sealing the opening is provided for containing an electric indicating instrument, a glass panel being provided in the door for observation of the instrument panel. The instrument comprises a front panel of the same rectangular configuration as the door opening but slightly smaller so that it may be moved in and out of the opening while parallel to the plane of the door. The instrument components are mounted on insulating walls or plates spaced from the front panel and from each other and are secured to the front panel on rigid spacing posts.

The back wall of the housing opposite the door opening is provided with a plurality of support posts rigidly secured to the back wall and extending to the position of the front panel. The plates are provided with openings for accommodating passage of the posts, and the panel is guided in movement into and out of the housing by engagement of these openings with the posts. The ends of the posts are tapered and when the instrument is to be inserted in the housing these tapered ends are first inserted in the openings in the rearward one of the plates and then the panel moves forward bodily while parallel to the plane of the door opening and the posts then pass into the recess in the second plate, and as the instrument is moved to its final position the ends of the posts rest against the panel and are secured thereto by screws.

Electrical connections to the instrument are provided through suitable sealed connectors passing through the bottom wall of the housing; and detachable connectors comprising complementary plugs and receptacles mounted on the housing and on the instrument provide the required electrical connections when the instrument is moved into position. These detachable connectors also serve to supplement the support of the instrument in the housing.

The features of novelty which characterize this invention are pointed out with particularity in the claims annexed to and forming a part of this specification. The invention itself, however, both as to its organization and method of operation, together with further objects and advantages thereof, will be best understood by reference to the following description taken in connection with the accompanying drawings in which:

FIG. 1 is a perspective view of an instrument assembly embodying the invention;

FIG. 2 is an enlarged front elevation view of the instrument of FIG. 1 with the door of the cabinet open to show the entire front panel;

FIG. 3 is a sectional plan view taken along the line 3—3 of FIG. 2;

FIG. 4 is a sectional elevation view of the housing taken along the line 4—4 of FIG. 2 with the instrument assembly shown in full;

FIG. 5 is a front elevation view similar to FIG. 2 with the instrument assembly removed;

FIG. 6 is a sectional view taken along the line 6—6 of FIG. 5; and

FIG. 7 is an enlarged detail view, partly in section, illustrating one of the supporting posts showing its position when the instrument is assembled thereon as viewed in FIG. 4.

Referring now to the drawings, the instrument illustrated in FIG. 1 is provided with a rectangular cabinet 10 having two hanger straps 11 provided with mounting holes at its upper corners and downwardly extending straps 12 having downwardly opening notches for facilitating the mounting of the cabinet on a wall or panel structure. The cabinet is provided with a single door 13 hinged along its left-hand edge and provided with a pair of closure clamps 14 and a locking hasp 15 so that the door may be clamped securely in its closed position and may be locked by placing a padlock (not shown) in a bail 16. The door 13 is provided with a glass panel 17 so that the instrument within the cabinet may easily be viewed.

The arrangement of the instrument panel within the cabinet is clearly shown in FIG. 2 wherein the door 13 is open and the instrument panel is indicated at 20, it being of rectangular configuration slightly smaller than the cabinet door opening indicated at 21. The various electrical connections for the instrument may be made at terminal connections 22, 23, 24 and 25, these connections being suitably sealed to the housing to render the housing airtight.

As shown in FIGS. 3 and 4, the panel 20 carries spaced mounting plates 26 and 27 which are rigidly attached and spaced on metal posts or spacers 28 between the panel 20 and the plate 26 and on posts or spacers 29 between the plates 26 and 27. The posts 28 and 29 hold the panel and plates rigidly in their required spaced positions and the various components of the instrument are mounted on the plates and panel in any suitable manner such as generally indicated on the drawing. The arrangement of these components is not necessary to an understanding of this invention and a detailed description is omitted.

The instrument panel 20 is securely attached to the housing on four posts indicated at 31, the panel being secured to the ends of the posts by machine screws 32. The posts 31 are secured to stub posts 33 rigidly attached to the back wall of the housing by welding or other suitable means as indicated at 34. The posts 33 carry positioning flanges 35 which engage upper and lower mounting straps 36 and 37 which are securely held between the posts 31 and the positioning flanges 35 in a manner described in further detail below.

The door is shown in FIG. 3 as open, it having been pivoted back on its hinge indicated at 38. The hinge is provided with an angle piece 40 which conforms to the contour of the box corner and is secured to the door frame by bolts 41 which hold a sealing gasket 42 positioned around the edge of the door so that when the door is closed the gasket engages an outer flange 43 of an outwardly extending frame 4 formed on the housing 10. Thus the instrument may be completely sealed within the housing 10 so that dust, ambient gases or the like do not circulate over the instrument components.

As shown in FIG. 5, when the instrument assembly has been removed the mounting strips 36 and 37 and the posts 31 are all exposed directly in line with the front door opening. The mounting strips 36 and 37 carry electric plug receptacles 45 and 46 which are positioned to engage complementary plug assemblies indicated at 47 and 48 in FIGS. 3 and 4, respectively. As shown in FIG. 6, the posts 31 extend normal to the back wall of the casing 10 and, when an instrument assembly is moved through the door toward the posts, the tapered ends of the posts, indicated at 50, may easily be aligned with openings near the corners of the back mounting plate 27, one of these openings being indicated at 51 in FIG. 7.

As the panel 20 is moved bodily toward the cabinet in a path normal to the plane of the door, the tapered portions 50 of the posts 31 pass through openings 52 in the plate 26, one of these openings being indicated in FIG. 7. The openings 51 and 52 are slightly larger than the posts and when the instrument is moved forward are easily located in the openings and the posts act as guides, first supporting the instrument on the plate 27 and then on both the plates 26 and 27 when the instrument may be pressed into its final position with the plug connectors in full engagement. The posts have threaded recesses in their outer ends 50 and these are readily aligned with openings 53 at the corners of the panel 20 and the screws 32 are then inserted and tightened into position to hold the panel securely in place in the cabinet.

Upon final movement of the panel into position, the plug connectors 45, 46, 47 and 48 are in full engagement as previously stated, and thus when the panel is secured in position by the screws 32 the electrical connections have been made and the instrument is ready for operation. The door is then closed, sealing the interior of the cabinet from the atmosphere.

As shown in FIG. 7, the posts 31 are provided with a cross hole 54 extending therethrough so that a bar or wrench may easily be engaged with the posts to tighten them in position on the cabinet and to remove them from the cabinet. The outer ends of the stub posts 33 are threaded as indicated at 55 and engage internal threads in the ends of the posts 31. The posts 31, when tightened into position as shown in FIG. 7, clamp the strips 36 and 37 between the posts and the positioning flanges 35. It will thus be apparent that the entire post assembly may readily be removed and the strips 36 and 37 and their electrical components removed from the supporting posts 33.

The arrangement of the posts acting as supports and guides for the cabinet assembly is such that precise positioning upon insertion of the cabinet assembly is not required, as the general location of the posts together with the tapered outer ends and the relatively large sizes of the openings 51 make it easy to position the instrument assembly for insertion. The exact position of the instrument assembly is determined by tightening of the screws 32 to secure the panel 20 on the posts. The electrical plug connections 45, 46, 47 and 48 include one component of each complementary pair which is free to move slightly laterally of the direction of relative movement of the components and facilitates the positioning of the complementary parts so that the connections are made without requiring access to the rear of the instrument when it is installed in the cabinet.

While the invention has been described in connection with a specific configuration of cabinet and instrument assembly, various other modifications and arrangements will occur to those skilled in the art. Therefore it is not desired that the invention be limited to the details of construction illustrated and described and it is intended by the appended claims to cover all modifications which fall within the spirit and scope of the invention.

I claim:

1. In combination, a closed housing having an access opening on one side thereof and a door for said opening, an instrument including a rigid front panel movable bodily into said opening while parallel with the plane of the opening, a combined guiding and mounting support for securing said instrument in said housing with said panel registering with said opening, said support comprising a plurality of straight bars each having one end rigidly secured to said housing at respective spaced points on the wall opposite said opening, said bars extending normal to the plane of said opening, guide means on said instrument for engaging said bars when said instrument is inserted in said opening and for guiding said instrument into position on said housing whereby said instrument may be moved into said housing, complementary electric contact mechanism on said wall of said housing and on said instrument positioned to be engaged upon movement of said instrument into position in said housing determined by the length of said bars, and means for attaching said panel to the other ends of said bars.

2. In combination, a closed housing having an access opening on one side thereof, means including a door for sealing said housing, an instrument including a rigid front panel and two circuit mounting plates spaced from said panel and from each other, said instrument being movable bodily into said opening, a combined guiding and mounting support for securing said instrument in said housing with said panel in registry with said opening, said support comprising a plurality of bars each having one end rigidly secured to said housing at respective spaced points on the wall of said housing opposite said opening, said bars extending from said wall normal to the plane of said opening and having their outer ends tapered, said spaced plates having pairs of openings therein of the configuration of and slightly larger than the cross sections of said bars whereby said instrument may be moved through said opening with said panel parallel to the plane thereof and with respective holes in the rearward one of said plates engaging the outer tapered ends of said bars and may be moved directly rearwardly until said ends of said bars engage the second openings of each pair whereupon said instrument may easily be moved further to the rear until it is stopped by said ends of said bars, and means for attaching said panel to said ends of said bars.

References Cited by the Examiner
UNITED STATES PATENTS

| | | | |
|---|---|---|---|
| 1,766,806 | 6/1930 | Wilcox | 58—52 |
| 2,063,976 | 12/1936 | Bateholts | 58—52 X |
| 2,254,920 | 9/1941 | Smith et al. | 317—120 X |
| 2,892,009 | 6/1959 | Scoville | 174—52 |
| 3,170,091 | 2/1965 | Hudson | 317—120 X |

CLAUDE A. LE ROY, *Primary Examiner.*

F. DOMOTOR, *Assistant Examiner.*